United States Patent [19]

Seng et al.

[11] 4,248,616
[45] Feb. 3, 1981

[54] POLLUTION ABATING, ENERGY CONSERVING GLASS MANUFACTURING APPARATUS

[75] Inventors: Stephen Seng, Frazeysburg; Richard K. Henry, Newark; Mark A. Propster, Gahanna; Charles M. Hohman, Granville, all of Ohio

[73] Assignee: Owens-Corning Fiberglas Corporation, Toledo, Ohio

[21] Appl. No.: 95,871
[22] Filed: Nov. 19, 1979

Related U.S. Application Data

[63] Continuation-in-part of Ser. No. 31,369, Apr. 19, 1979, abandoned.

[51] Int. Cl.³ .............................................. C03B 3/00
[52] U.S. Cl. .......................................... 65/335; 65/27; 65/134; 55/99; 55/390; 106/52; 106/DIG. 8; 264/117
[58] Field of Search ......................... 65/27, 134, 335; 106/DIG. 8, 52; 264/117; 55/99, 390

[56] References Cited

U.S. PATENT DOCUMENTS

| Re. 29,622 | 5/1978 | Lange | 65/27 |
|---|---|---|---|
| 2,220,750 | 11/1940 | Blair | 106/52 X |
| 2,366,473 | 11/1945 | Blair | 106/52 |
| 2,597,640 | 5/1952 | Howard | 65/335 |
| 3,542,534 | 11/1970 | Yamamoto | 65/27 |
| 3,726,697 | 9/1979 | Mod et al. | 264/117 X |
| 3,728,094 | 4/1973 | Bowman | 65/27 |
| 3,767,751 | 10/1973 | Simmingskold et al. | 264/117 |
| 3,788,832 | 1/1974 | Nesbitt et al. | 65/134 |
| 3,880,639 | 4/1975 | Bodner et al. | 65/134 |
| 4,023,976 | 5/1977 | Bauer et al. | 106/52 |
| 4,026,691 | 5/1977 | Lovett et al. | 65/27 |
| 4,031,175 | 6/1977 | Cooper et al. | 264/117 X |
| 4,113,459 | 9/1978 | Mattmuller | 65/135 |
| 4,184,861 | 1/1980 | Erickson et al. | 65/27 |

FOREIGN PATENT DOCUMENTS

862535 12/1977 Belgium .

OTHER PUBLICATIONS

"Moglichkeiten der Industrellen Pelletierung von Glasse Mengen", Glastechnische Berighte, 50(1): 19–23, (1977), B. Mueller.
Glass, Feb. 1965, pp. 68, 69.
British Glass Industry Assc., "Pelletization of Glass Batch" by G. Higginbotham, Dec. 1977.
Glastechnisk Tidskrift, 25, (1970): 4, pp. 83, 84.
"Agglomeration in the Glass Industry-An Energy and Environmental Tool-Part 1," W. H. Engelleitner, Glass, Dec. 1978, p. 564.
"Seminar on the Exciting Prospects of Glass Batch Briquetting", American Glass Review, Nov. 1977, pp. 6, 7, 8.
"Batch Pelletizing and Preheating", The Glass Industry, Jul. 1979, by Bansal et al., pp. 12, 13, 14, 15, 26, 29.
"Pilot Plant Test Program for Glass Batch Briquetting, Prereacting and Melting", Colorado School of Mines Research Inst., Project A50829 9/23/77.
39th Annual Conference on Glass Problems, 11/15/78, Ohio State University, Columbus, Ohio, EPA Batch Pretreatment Project, by Boettner et al.
Harrop OSCIPLATE TM -A Brochure=U.S. Pat. No. 3433468.

Primary Examiner—Arthur D. Kellogg
Attorney, Agent, or Firm—Ronald C. Hudgens; Robert F. Rywalski; Paul T. Kashimba

[57] ABSTRACT

An apparatus is provided for preconditioning and preheating pellets of glass batch prior to heating and melting them in a furnace. Components of glass batch are mixed together and combined with water to form agglomerates, e.g., pellets. These agglomerates are supplied to a hopper through which hot combustion gases are passed and they are preheated to an elevated temperature in the hopper prior to entering the melting furnace, thereby resulting in a savings of substantial amounts of energy. Moisture is removed from the agglomerate prior to their being supplied to the hopper; hence, the tendency for the agglomerates to adhere to one another and form aggregates, or clinkers, is substantially controlled. For that purpose, the agglomerates are collected in a preconditioner having receptacles located above the bed of agglomerates in the hopper with the hot gases also passing through the agglomerates in the receptacles after passing through the bed in the hopper. After moisture is removed, the agglomerates are dropped from the receptacles onto the bed in the hopper. The agglomerates may be melted in a combustion fired melter or in an electrically powered melter.

44 Claims, 10 Drawing Figures

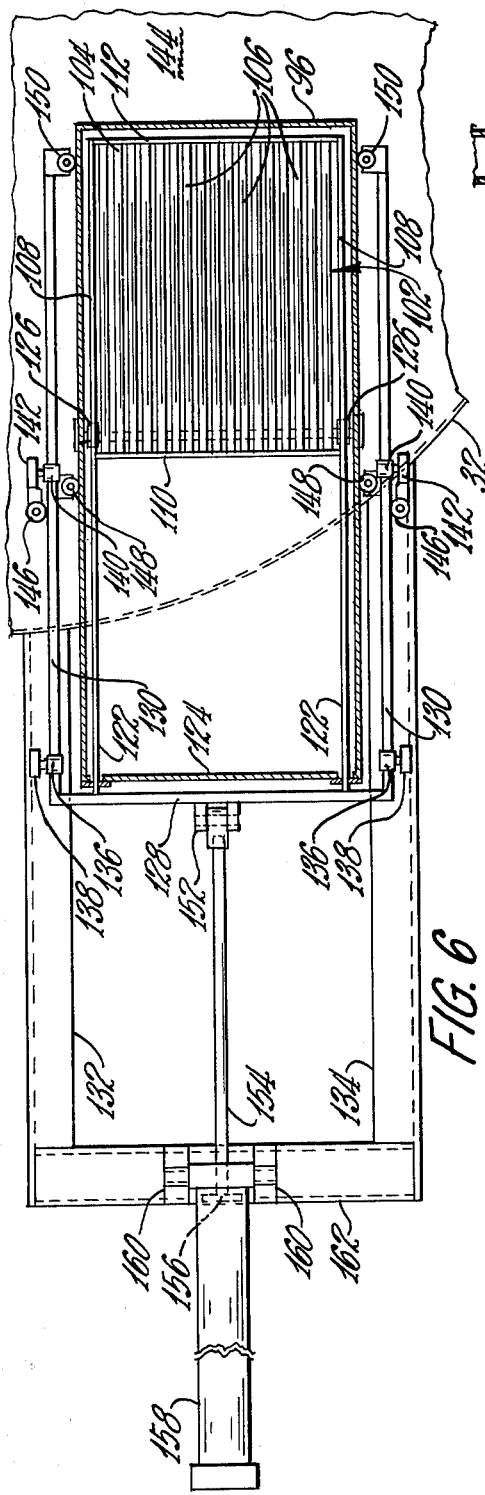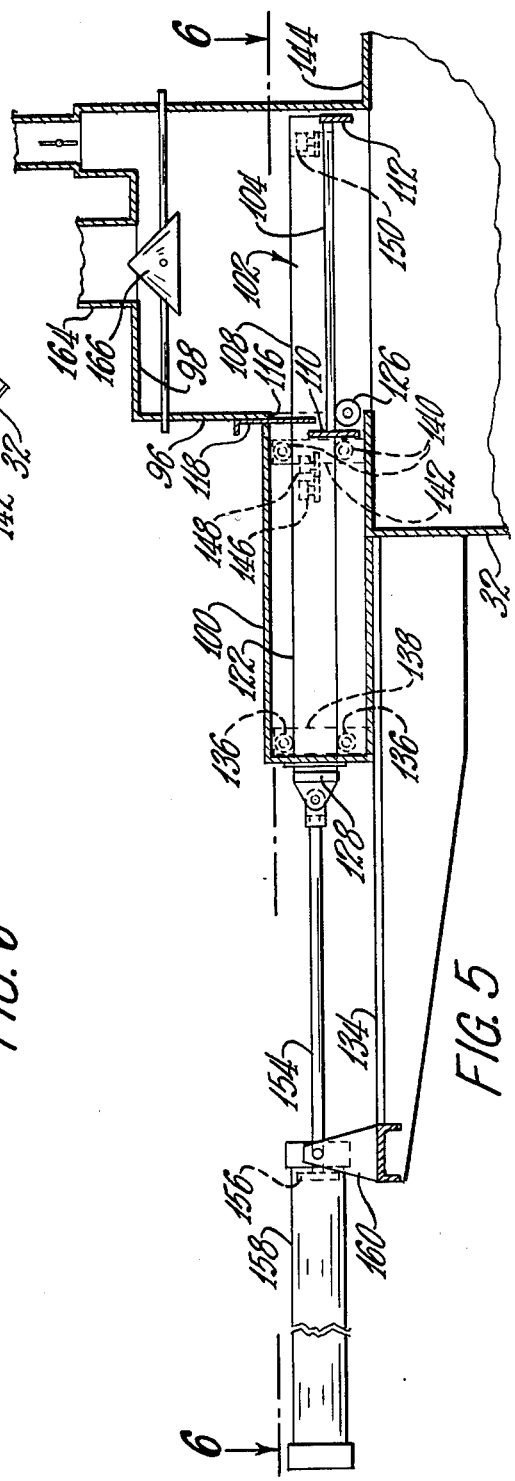

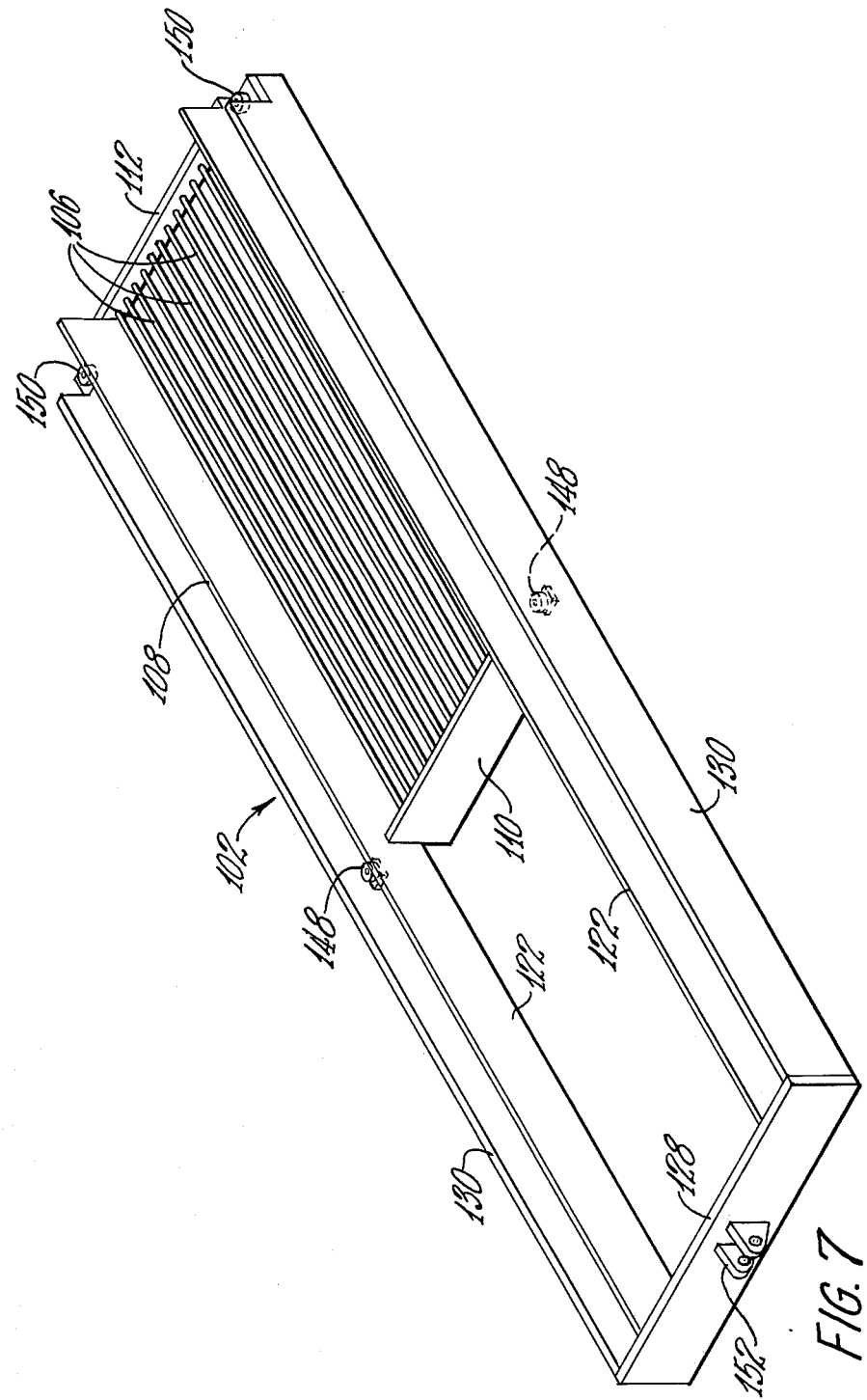

POLLUTION ABATING, ENERGY CONSERVING GLASS MANUFACTURING APPARATUS

CROSS REFERENCES

This is a continuation-in-part of copending application U.S. Ser. No. 031,369 filed Apr. 19, 1979, now abandoned which is hereby incorporated by reference.

TECHNICAL FIELD

The present invention relates to the art of glass manufacturing; more specifically the present invention relates to the art of glass manufacturing wherein glass forming batch ingredients are formed into agglomerates which are fed to a melter for vitrification. Even yet more particularly the present invention relates to a glass manufacturing apparatus wherein agglomerated glass batch ingredients are dried and preheated to an elevated temperature by direct contact with hot gases, e.g., flue gases from a fossil fuel fired melter, so as to provide an economical glass manufacturing apparatus with improved throughput and which enhances pollutant recovery and minimizes energy losses and/or energy consumption.

BACKGROUND

In our copending application U.S. Ser. No. 031,368 and in copending application U.S. Ser. No. 095,870 filed concurrently, herewith, which applications are hereby incorporated by reference, there is described a process for drying and preheating free water containing glass batch agglomerates, preferably pellets, to an elevated temperature prior to melting. That process is especially uniquely adapted to drying and preheating hydrologically unstable agglomerates, that is free water containing glass batch agglomerates which, when attempted to be dried and preheated in a bed by direct contact with melter flue gases, or separately provided hot gases having a wet bulb temperature equivalent thereto, i.e., about 130° F. to about 140° F., convert or coalesce into process disabling aggregates during the drying operation.

When so dried with such gases having a wet bulb temperature of about 130° F. to about 140° F., a bed of hydrologically unstable agglomerates has an inherent or imminent aggregate forming height, below which no serious aggregation occurs, but this height is such as not to allow for the economic use of a shaft type preheater, or hopper, having a vertical bed of agglomerates therein to dry and preheat such agglomerates in a single processing operation. The application also discloses that the inherent, or imminent, aggregate forming height can be changed upwardly, to an adjusted imminent, or inherent, aggregate forming height, by decreasing the wet bulb temperature of the gaseous medium used to dry the bed of hydrologically unstable agglomerates. If melter flue gases are the gaseous combustion products used for drying, this can be done by diluting the flue gases with ambient air prior to passing them through a bed of the free water containing agglomerates; on the other hand if the gaseous drying medium is separately produced by the combustion of a suitable fuel, e.g., natural gas, the wet bulb temperature can be dropped below the 130° F. to 140° F. range by similarly diluting the combustion products or, more conveniently, by effecting such combustion with an excess of stoichiometric air. Even the adjusted inherent aggregate forming height corresponding to the use of a heating medium having a wet bulb of about 80° F.-85° F. is also such as not to economically allow a vertical bed of free water containing agglomerates to be dried and preheated in a single processing operation.

Exemplary glass compositions, which when agglomerated with water exhibit such hydrological instability, are the alkali metal oxide containing glasses and especially those containing $Na_2O$, on a dry, theoretical oxide basis, in excess of about 5 or 6% by weight. Commonly such glasses contain about 5 to about 25% $Na_2O$ and are further exemplified by flat glass, bottle glass and fiberizable glasses which glasses typically contain about 10% to about 20% by weight $Na_2O$. The amount of water in such hydrologically unstable agglomerates is usually about 5% to about 20% by weight (dry basis).

The foregoing incorporated applications disclose a process for manufacturing glass from such type agglomerates wherein the agglomerates are dried and then preheated to an elevated temperature, e.g., to excess of 450° C. or 500° C., but short of causing the agglomerates to sinter or fuse together, and then charged to a glass melter at that elevated temperature for melting. Preferably the agglomerates are pellets having a size of about ¼ inch to about 1 inch, desirably about ⅜-⅝ inch, with a water content of 10-15%. The process contemplates forming separate preconditioning beds of the agglomerates, which beds are at least partially dried to a hydrologically stabilized state and then the beds are discharged to a main vertical bed, which is maintained in a shaft type preheater, or hopper, where the agglomerates are heated to an elevated temperature and supplied to a glass melter for vitrification. Hot heating gases, e.g., combustion products, pass upwardly, directly through the main vertical bed, in counter-current flow to gravitationally downwardly moving agglomerates, to preheat them and then the gases are conveyed to preconditioning chambers to precondition static beds therein to a hydrologically stabilized state, i.e., a state where process disabling aggregates neither form in the preconditioning chambers nor subsequently in the shaft type preheater, or hopper. Preferably, plural preconditioning chambers are used with the beds being formed, preconditioned and discharged in a cyclic, sequential manner and in a generally parallel flow pattern. The height of the formed preconditioning beds is important and the process may be adjusted such that the bed height is less than the inherent aggregate forming height, less than the adjusted inherent aggregate forming height corresponding to the wet bulb temperature of the gases used for heating and drying, or greater than the adjusted inherent aggregate forming height corresponding to the wet bulb temperature of such gases used for preconditioning. It is contemplated that the wet bulb temperature of the combustion products, at least prior to being conveyed to the preconditioners, be decreased, as by dilution with air, to less than the wet bulb temperature of flue gases emanating from a fossil-fuel fired glass melter, e.g., to less than about 130° F.-140° F. Typically, the height of the preconditioning beds formed of the free water containing agglomerates will be between about 2 inches to about 9 inches.

An object of the present invention is to provide an improved glass manufacturing apparatus adapted to industrially exploit the above process.

Another object of the invention is to provide an improved apparatus for preconditioning hydrologically unstable glass batch agglomerates prior to supplying them to a hopper through which hot combustion gases from a melting furnace are passed.

Another object of the invention is to provide an apparatus for removing moisture from a batch of pellets above a bed of pellets in a hopper by passing hot gases through the bed of pellets and then through the batch of pellets so that the pellets may then be melted in a more efficient manner.

A further object of the invention is to provide an apparatus for preconditioning a bed of agglomerates, preferably pellets, above a vertical bed of pellets in a hopper and then physically dropping the pellets on top of the vertical bed of pellets in the hopper.

Still another object of the invention is to provide an apparatus for preconditioning glass batch agglomerates above a vertical bed of agglomerates in a hopper in a plurality of receptacles to which newly-formed agglomerates are supplied in a sequential relationship.

The general object of the present invention is to provide for an improved glass manufacturing apparatus. The apparatus recovers and beneficially employs otherwise wasted energy, it enhances environmental quality by recovering and recycling potential pollutants and provides for increased glass melter throughput with substantial fuel savings. Rather than requiring the use of massive equipment which consumes substantial amounts of precious floor space in a glass manufacturing plant, the present invention more economically employs small preconditioning chambers which allow for the operative, economic use of a shaft type preheating chamber to preheat agglomerates to an elevated temperature prior to melting. By mounting such preconditioning chambers adjacently above the preheating chamber, minimal floor space is consumed.

Many other objects and advantages of the invention will be apparent from the following detailed description.

BRIEF DESCRIPTION OF THE DRAWINGS

While the drawings represent a preferred embodiment of this invention and are described with reference to the use of free water containing, glass batch pellets, it is to be understood that the invention is not so limited. Thus, for example, other forms of free water containing glass batch agglomerates may be used, including, for example, extrusions, discs, briquettes, or other geometric shapes. Generally, the amount of free water in such agglomerates will be between about 5% to about 20% by weight on a dry basis. Referring to the drawings:

FIG. 5 is an enlarged, longitudinal section of a pellet receptacle and chamber of FIGS. 3 and 4;

FIG. 6 is a view in horizontal cross section, generally taken along the line 6—6 of FIG. 5;

FIG. 7 is a view in perspective of an apparatus upon which the preconditioning beds are formed and from which they are discharged.

DESCRIPTION

Figure 1:
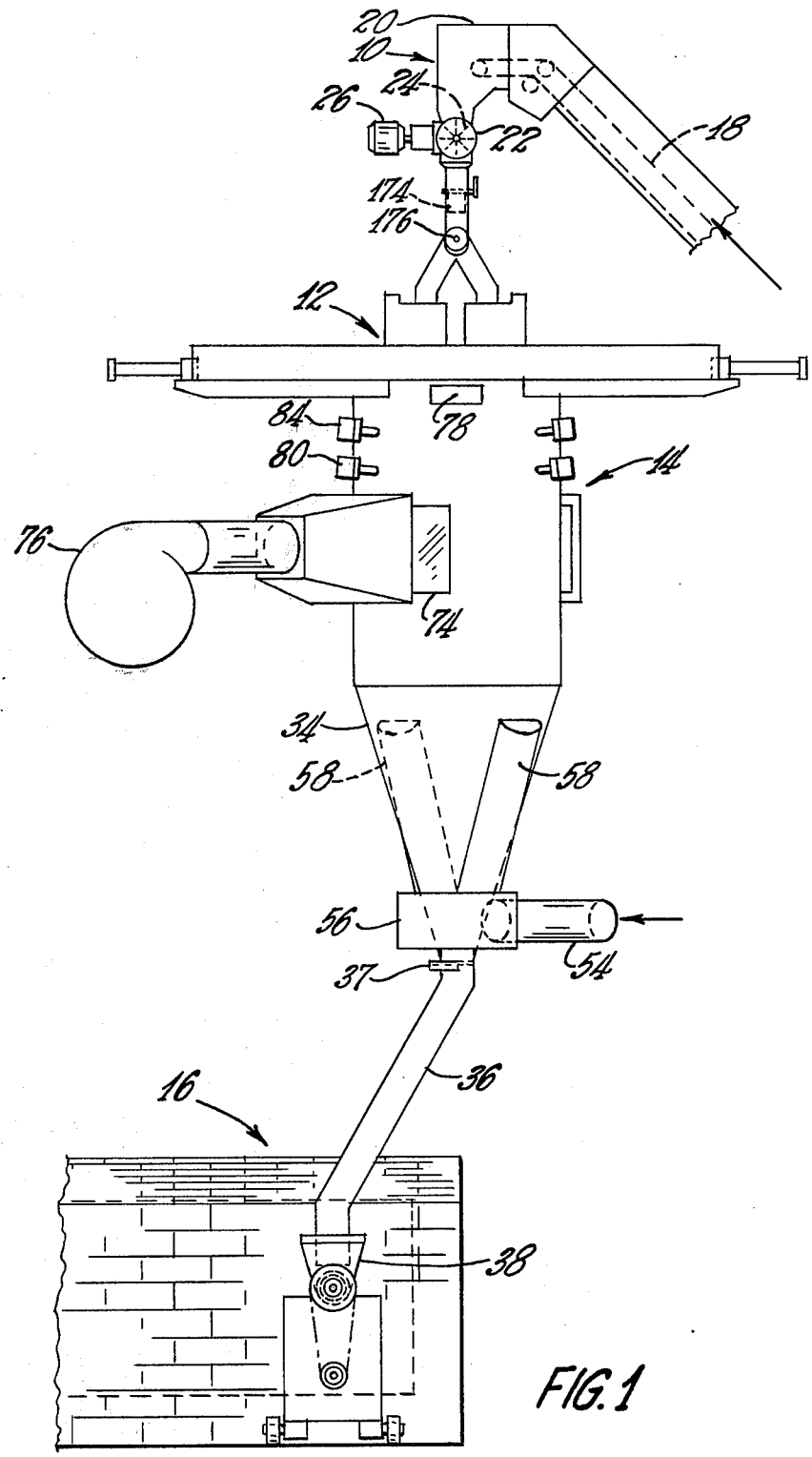
FIG. 1 is a front view in elevation of overall apparatus for handling glass batch pellets, including a preconditioner, a hopper, and a melting unit or furnace.

As previously generally indicated, the present invention is especially uniquely adapted for use in drying and preheating hydrologically unstable, free water containing glass batch agglomerates, preferably pellets. Exemplary of such glass batches are the soda-lime-silicate and soda-lime-aluminoborosilicate glasses. Fuller particulars in this respect are set forth in the above incorporated application, Ser. No. 031,368, now abandoned.

While not shown in the drawings, it is contemplated that glass batch ingredients, and water, are combined substantially simultaneously on a rotary disc pelletizer into free water containing batch pellets. While pelletizing is an art and the pelletizer will need to be adjusted for optimum results on any specific glass batch, it is desirable to control the pelletizer using the water control scheme generally set forth in copending application U.S. Ser. No. 965,632 filed on behalf of Mr. Seng. That is a pivotally supported paddle type sensor, which may be spring biased or counterweighed, is employed to control the feed of water to the pelletizer. Preferably the paddle will be located in the finished pellet stream, as set forth in copending application Ser. No. 974,470 filed on behalf of Mr. Henry, generally in central portion of a sector of the disc defined between about an 8 to 9 o'clock position. The water supply will include one duct supplying a constant flow of water to a main supply line and a second duct containing a solenoid valve also in fluid communication with the main supply. The paddle sensor is used to operate the solenoid valve in an on-off fashion, as set forth in the above Seng application so as to produce substantially uniform size pellets. Generally, when facing the inclined rotary disc pelletizer and considering the uppermost portion as the 12 o'clock position, batch will be supplied to the pelletizer along a chord of the disc between about the 5:30 and 6:30 positions with the water supply being furnished by sprays located generally on a chord between the 4 and 8 o'clock positions and to right of a diameter running through the 6 and 12 o'clock positions of the circular disc of the pelletizer. Desirably the pelletizer will also be equipped with a rotary scraper device. This device includes two pairs of generally normally related arms with each arm having a radius of about one-half the radius of the pelletizer disc and has its axis of rotation about midway along the radius of the disk drawn to about the 3 o'clock position. One pair of arms, which may be viewed as a diameter of the circle through which the device rotates, includes scrapers at its diametric end portions adapted to scrape the sidewall of the rotating disc pelletizer. The other pair of arms include diametrically opposed scrapers operating closely adjacent to the bottom of the disc of the pelletizer. The disc will also be provided with a stationary plow extending inwardly from about the 11:30 position and intersecting a diameter through the 6 and 12 o'clock positions at an angle of about 45°. It is also preferred to coat the pellets after discharge from the pelletizer with small amounts of dry batch, e.g., about 1 to about 5 parts of dry batch per about 100 parts by weight of free water containing pellets. It is also preferred to pass such pellets through a suitable sizing device to separate out pellets of about ⅜ to about ⅜ inch in diameter for further processing, i.e., drying, preheating to an elevated temperature and then melting. If desired, undersize pellets may be recycled directly to the disc pelletizer. In those respects, reference may be had to copending Application Ser. No. 031,290. An alternate water control scheme is set forth in Ser. No. 974,470.

Figure 2:
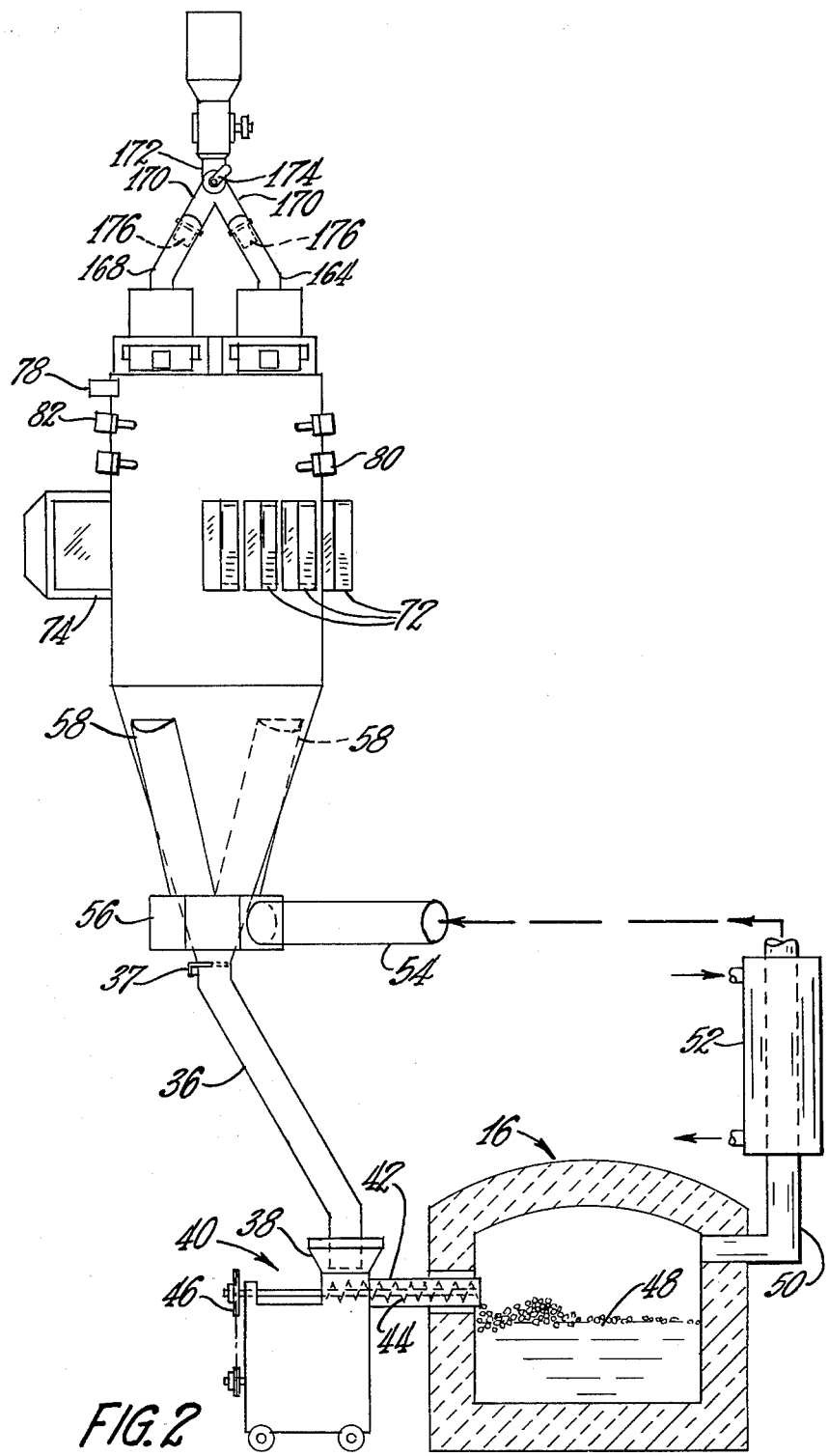
FIG. 2 is a side view, with parts in section, of the apparatus of FIG. 1.

Referring to the overall apparatus of FIGS. 1 and 2, pellets are carried up a conveyor 10 and supplied to a preconditioner 12, then to a hopper, or shaft-type preheater, 14 from which heated and dried pellets are supplied to a melting furnace, or glass melting tank, 16.

Conveyor 10 includes a conveyor belt 18 located in an enclosure 20. Preferably, the conveyor is a FLEX-OWALL conveyor. The pellets are discharged off the belt 18 to an air lock comprising a cylindrical chamber 22 in which are a plurality of rotary vanes 24 driven by a motor 26. The pellets are received in the space between the vanes and are discharged therebelow as the vanes rotate. However, the vanes form a seal with the chamber 22 so that air cannot flow downwardly past the vanes. These pellets are then supplied to preconditioner 12 where they are preconditioned to a hydrologically stabilized condition prior to being discharged unto a vertical bed in a shaft type preheater where the pellets are then preheated, prior to melting in a furnace, to an elevated temperature, e.g., in excess of 400° C. (752° F.) and preferably in excess of 500° C. or even 600° C. The preconditioner will be discussed subsequently.

Thus, after preconditioning, the pellets are dropped into the hopper 14 and specifically onto a vertically-moving bed 28 comprised of pellets moving slowly downwardly in a cylindrical chamber 30 formed by walls 32 of the hopper 14. As the pellets of the vertical bed move down the chamber 30, they enter a discharge funnel 34 and are discharged down a supply duct 36 to a supply hopper 38 of a batch feeder indicated at 40. In this instance, the batch feeder 40 has a supply conduit 42 in which is an auger 44 driven by a gear and sprocket arrangement indicated at 46 and by a motor (not shown) within the batch feeder housing. When the auger 44 is rotated, it supplies the pellets from the hopper 38 through the conduit 42 unto molten glass 48 located within the furnace 16.

While the actual size of hopper 14 will vary with different installations, it will, in general, be preferred to have hopper 14 be rather tall and narrow. Outstanding results will be attained when, for example, the ratio of the height of the cylindrical portion to the height of the funnel portion is about 0.8 to 1 with the height of the cylindrical portion being one and one-half to about twice the diameter of the cylindrical portion. Desirably, the diameter will be such that the superficial velocity of heating gases flowing through hopper 14 will be between about 60 to about 130 standard feet per minute. Preferably, the included angle between diametrically opposed side wall portions of the funnel portion will be about 30°-40° and e.g. 36°. Typically, the diameter of the cylindrical portion may be about 7 or 8 feet.

Hot combustion gases from the furnace 16, above the molten glass 48, are directed through a main exhaust duct 50 to a heat exchanger 52, e.g., a regenerator or recuperator, through which make-up combustion air is also passed in heat-exchanging relationship. The combustion gases, generally cooled to a temperature of about 1000° F. to about 1500° F. in heat exchanger 52, but still hot, then flow through duct 54 to an annular manifold 56 located around the funnel 34 of the hopper. Semicylindrical, diametrically-opposed ducts 58 communicate with the manifold 56 and extend upwardly along the funnel 34 of the hopper where they communicate with openings 60 (FIG. 4) in the funnel 34. The ducts 58 minimize heat loss from the pellets in the funnel 34 where heat loss tends to be the highest. Helping to distribute the hot combustion gases emitted from the openings 60 in the funnel 34 is a gas distributor 62 in the form of a wedge, or inverted V-shaped bar, with an included angle of about 60°, in fluid communication with the diametrically opposed openings 60. For proper gas distribution through the pellet bed, it is preferred that the level of pellets above the gas inlet be maintained at a height about equal to, to about 1.5 times the diameter of the cylindrical chamber. It will, of course, be appreciated that for any given installation some adjustments will need to be made to obtain optimum uniform gas and pellet flow through hopper 14. Generally, however, it will be desirable to locate the wedge in the funnel portion such that its base, or bottom terminus, is at a level, beneath the juncture of the funnel and cylindrical portion, equal to about 0.1 to about 0.5 times the diameter of the cylindrical portion. Additionally, as will be readily appreciated by those skilled in the art, as the agglomerates flow past distributor 62, a void area, or more exactly a void volume, will generally form adjacently beneath the apex of the wedge; this area may be viewed as diamond shaped with the uppermost portion being defined by the internal surfaces of the inverted V-shaped bar and the lowermost portion, which is largely governed by the angle of repose of the agglomerates employed, being a V-shaped portion. Suitably, gas distributor 62 will be positioned in the funnel such that the open area, for pellet and gas flow around the wedge, will approximately be equal to about the total surface of the V-shaped lowermost portion.

Figure 3:
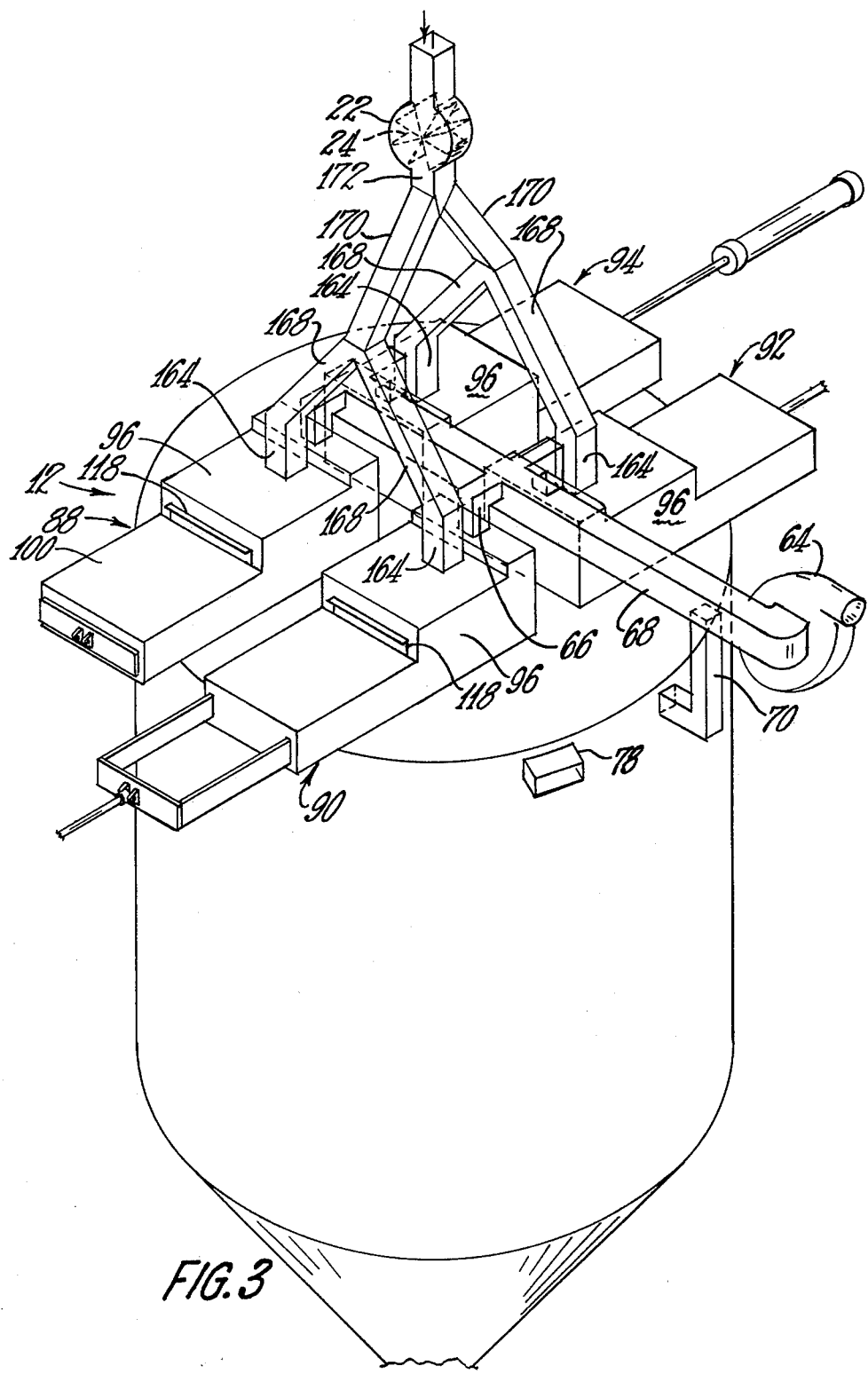
FIG. 3 is a schematic view, in perspective, of the hopper and preconditioning apparatus shown in FIGS. 1 and 2.
Figure 4:
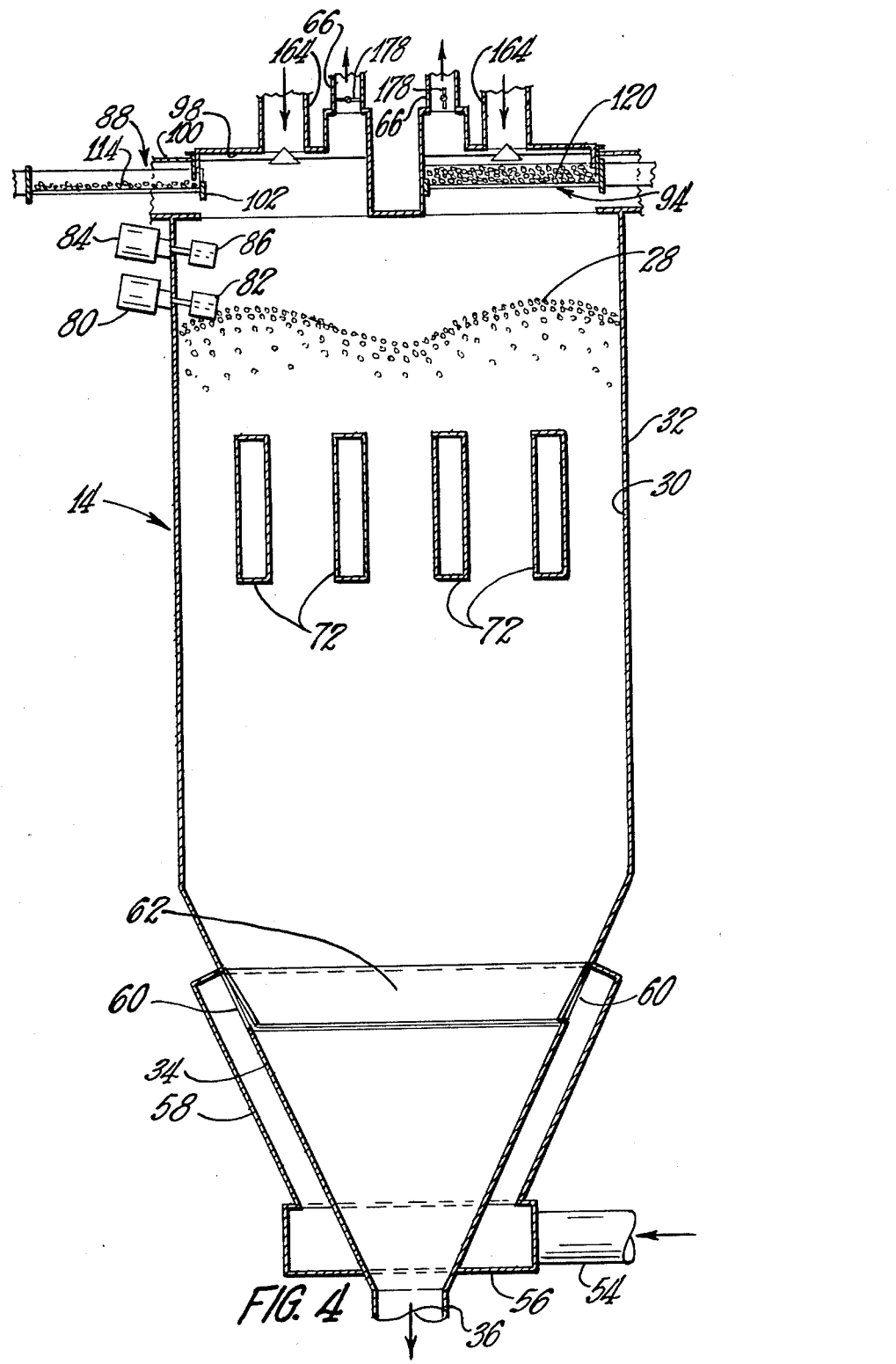
FIG. 4 is a somewhat schematic view in vertical cross section of the preconditioner and hopper of FIGS. 1 and 2, on an enlarged scale.

Referring to FIGS. 3 and 4, when an exhaust blower 64 operates, it draws hot gases through the exhaust duct 54, through the manifold 56, and through the passages formed by the semicylindrical ducts 58. From here the gases enter the openings 60 and flow to distributor 62, then upwardly through the bed 28 of pellets and then, generally, to the preconditioners 12. The gases are then exhausted through four branch ducts 66 to a main duct 68 communicating with the exhaust blower 64. If desired, some gases can also be directly supplied from the upper portion of the chamber 30, through a by-pass exhaust duct 70, to the exhaust duct 68, thereby by-passing the preconditioner. The velocity of the gases passing through the preconditioner can thereby be controlled. In passing, however, it should be mentioned that care should be taken so that the temperature of the gases, especially in the preconditioner, is maintained sufficiently above the wet bulb temperature so as to preclude water condensation problems.

If desired, to control the temperature of the combustion gases in the upper portion of the bed 28 of pellets, a plurality of elongate rectangular ducts 72 (FIGS. 2 and 4) can be located transversely through the hopper 14 and may open to the ambient beyond the hopper wall 32 at their discharge ends. The opposite ends of the ducts 72 communicate with a supply manifold 74 (FIGS. 1 and 2). The ducts can be supplied with ambient air as a heat transfer medium by a blower 76.

Preferably, the gaseous combustion products prior to being supplied, or directed, to preconditioners 12, will be diluted with, for example, ambient air. Such dilution serves to lower the wet bulb temperature of the gases used for preconditioning and will, therefore, increase the height at which the beds of the preconditioners may be operated. For example, if flue gases from the glass melter are employed without dilution, and the bed is totally dried with such gases, the bed height may not exceed the inherent aggregate forming height, which may only be about 2 inches; otherwise process disabling aggregation will occur in the preconditioners. In contrast, if such gases are diluted with air so that the mixture corresponds on a calculated basis to a wet bulb temperature of about 100° F., the adjusted inherent aggregate forming height may typically be about 6 inches; consequently, the bed height may be up to about 6 inches and no process disabling aggregation will occur in the preconditioners when the beds therein are totally dried. When using flue gases from a glass melter having a wet bulb temperature of about 137° F., such dilution may be effected by diluting such flue gases about 400%, i.e., the volume ratio of ambient dilution air to the volume of flue gases being about 4:1. Suitable dilution levels will be from about 50% to about 800%, but most desirably about 50% to about 400%. Such dilution air may be supplied by suitable means, e.g., through a short inlet duct 78, disposed in the headspace of hopper 14, and controlled by a suitable valve (not shown). Leakage of ambient air into preconditioner(s) 12, which is under a negative pressure, effects substantially equivalent results. The air used for dilution may be heated combustion make up air; that is, when the amount of combustion make-up air which is preheated prior to combustion, as in a recuperative or regenerative heat exchanger, is in excess of that actually needed for combustion such excess, commonly referred to as "spill-air", may be used for dilution. In that way the energy normally wasted in such spill air will be beneficially utilized. Since, as previously generally indicated, the temperature of the gases exiting from the preconditioner(s) should be such as to ensure no water condensation, the introduction of such spill air will be of assistance in helping to maintain such exiting gas temperature sufficiently above the dew point to preclude such condensation. Additionally, because of the higher dry bulb temperature, such spill air can also beneficially influence the drying rate. Similarly, if desired, instead of or in addition to the introduction of spill air into duct 78, another gaseous medium may be employed to decrease the wet bulb temperature of the gases going into a preconditioner and/or to increase the dry bulb temperature. Such medium can, for example, be electrically heated air or can comprise combustion products as, for example, that resulting from combustion with an excess of stoichrometic air. Desirably, the system will be operated such that the temperature of the gases after passage through the bed of pellets, in which the pellets have no relative motion to each other, of the preconditioners will be about at least 350° F. or 400° F.

To sense the height of the pellet bed 28, a lower level of a plurality of low-torque motors 80 is located outside the hopper wall 32 having paddles 82 disposed in the chamber 30. Similarly, an upper level of a plurality of low torque motors 84 have paddles 86 in the chamber 30. When the pellets of the bed 28 contact the paddles 82 or 86, the power supplied to the motor 80 or 84 changes abruptly, thereby indicating the height of the pellet bed 28 in the chamber 30. When the height of the bed approaches a predetermined value, the pelletizer (not shown), including the batch and water supply to the pelletizer, can be shut off until the height drops again, at which time pelletizer operation is again initiated.

As generally previously indicated, in order to overcome the process-disabling aggregate formation problem, (as would occur if the free water containing hydrologically unstable agglomerates were to be directly supplied to hopper 14 and attempted to be dried by direct contact with combustion gas therein) the agglomerates are first preconditioned to a hydrologically stabilized state. This is effected by drying static beds of such agglomerates in separate chambers then discharging such beds, prior to their having irreversibly converted into process disabling aggregates, unto vertical bed 28 of preheating chamber 14. Preferably, the beds are discharged gravitationally downwardly to a main vertical bed by moving the preconditioning beds laterally sidewise against a means, or member for scraping the bed from a bed supporting means.

Referring particularly to FIGS. 3 and 4, the preconditioner 12 includes a plurality, four in this instance, of preconditioning units 88, 90, 92, and 94. The units are substantially identical, each including a housing 96 forming a pellet-drying, or preconditioning, chamber 98 above the hopper chamber 30, and in communication therewith (FIG. 5), and also including a side housing 100 enclosing a laterally movable pellet-detaining receptacle 102. The units are mounted adjacently upwardly of hopper 14 and most desirably substantially directly on the upper wall of hopper 14. In this way, since floor area is at a premium in glass manufacturing plants, the pellets can be expediently dried and preheated in a substantially vertical flow path. Preferably, the preconditioning chambers are rectilinear in cross section and, most desirably are square.

Each of the receptacles 102 includes a porous bottom 104 formed, in this instance, by a plurality of parallel rods 106. These are close enough together to prevent pellets from dropping therethrough and yet enable the hot combustion gases flowing through the bed 28 of the pellets to also flow through the bottom of the receptacle with minimum pressure drop. Each receptacle also has side walls 108, an outer end wall 110, and an inner end wall 112 (FIG. 5). Rods 106 are suitable supported in inner end wall 112. Desirably, the upper terminus of wall 112 is disposed beneath the upper terminus of side walls 108 and the wall 112 preferably extends above the rods 106 about 1½ inches and serves to maintain a thin layer 114 (FIG. 4) of dried pellets on the bottom 104 even when the receptacle 102 is in its outer position. In this way the thin layer e.g., a 1½ inch layer, serves as a flow straightener to provide more uniform gas flow through the bed of wet pellets which are to be dried or preconditioned. The outer end wall 110 extends downwardly below the rods 106 and serves as a means to scrape pellets into the hopper that may have fallen in the housing 100.

The receptacle 102 is movable between a position wholly within the drying chamber 98 and a position within the side housing 100. The receptacle moves outwardly through a housing opening 116 having a vertical adjustable slide or wiper 118 which contacts one side of the preconditioning bed as the receptacle is moved outwardly. The contact of the wiper with the side of the preconditioning bed, generally, results in pushing a batch, or preconditioning bed, 120 of pellets laterally sidewise over inner wall 112 whereby they drop into hopper 14 through an opening in the top wall thereof. Generally, the thin dried layer of flow straightening pellets 114 which are disposed beneath the upper terminus of wall 112 remain in the receptacle 102 and another preconditioning bed of wet pellets will be formed thereon which bed, after preconditioning, will be similarly discharged.

For moving the receptacle 102, the side walls 108 (FIGS. 5 and 6) have extensions or bars 122 extending from the ends adjacent the outer end wall 110 through vertical slots in an end wall 124 of the housing 100. Two rollers 126 are rotatably supported near the bottom of the opening 116 and engage and support the bottom edges of the side walls 108. Outside the end wall 124, the extensions 122 are affixed to a cross bar 128 from the ends of which side bars 130 extend forwardly outside the housing 100 and the housing 96.

Elongate support means, or beams, 132 and 134 are affixed to the side wall 32 of the hopper 14 and extend horizontally outwardly, parallel to the side bars 130. Outer rollers 136 engage and support outer upper and lower edges of the side bars, and, in turn, are supported on the beams 132 and 134 by brackets 138. Similarly, intermediate rollers 140 engage intermediate upper and lower edges of the side bars 130 and have brackets 142 supported on a top 144 of the hopper 14. Spring-loaded guide rollers 146 are also mounted on the brackets 142 and engage outer surfaces of the side bars 130. The side bars 130, in turn, have intermediate guide rollers 148 and 150 which engage the side walls of the housings 96 and 100. These three pairs of guide rollers guide the side bars and, in turn, the receptacle 102 during inner and outer movements.

The cross bar 128 has a clevis 152 affixed thereto to which a piston rod 154 is pivotally connected. The piston rod is connected to a piston 156 in a fluid-operated cylinder 158 which is pivotally mounted on ears 160 of a transverse beam 162 extending between the ends of the horizontal beams 132 and 134.

When the receptacles 102 are in their inner positions in a preconditioning chamber 98, pellets are supplied thereto through four branch supply ducts 164. In order to obtain most reliable operation, pellets supplied through ducts 164 should be uniformly distributed in the preconditioning chambers so that the bed of free water containing pellets formed therein will have a substantially uniform height. Adjustable distribution members 166 are thus located below the discharge ends of the ducts 164 to aid in distributing the pellets unto the thin layer of the retained flow straightening pellets in receptacles 102. The preferred distributors are set forth in copending application U.S. Ser. No. 031288. Ducts 164 connect to converging branch ducts 168 (FIG. 3), the upper ends of which communicate with two branch supply ducts 170. These also converge and communicate with one main supply duct 172 located below the cylindrical chamber 22 and in communication therewith. A two-way diverter valve 174 (FIGS. 1 and 2) diverts pellets from the main duct 172 to either of the two branch ducts 170. Two additional two-way diverter valves 176, in turn, divert the pellets from the branch duct 170 so that they are supplied to either of the branch ducts 168 communicating therewith.

Static preconditioning beds, or batches, 120 of pellets (FIG. 4) are sequentially and cyclically deposited in the receptacles 102. This is done by employing the various diverter valves and selectively supplying the pellets to the respective chambers for predetermined time periods and in this way controlling the bed height. A suitable timer or timers may, for example, be employed. Typically, the apparatus will be adjusted to provide for the formation of a bed of free water containing pellets which will have a maximum predetermined height generally in the range of from about two inches to about nine inches. While a receptacle is being filled, a valve 178 is closed in the duct 66 appurtenant to the chamber involved to prevent gases in hopper 14 from flowing through an opening therein and through the chamber. When the closed valve 178 is opened again, a portion of the combustion gases supplied upwardly through the vertical bed of pellets 28 is also supplied through the wet bed, or batch, 120 of pellets. These gases precondition the web pellets of the beds by removing moisture therefrom so that they will not stick together and form process disabling aggregates or clinkers when supplied onto the upper surface of the bed 28 and moved downwardly through the hopper chamber 30. The pellets are likewise discharged from the receptacles 102 of the various preconditioning chambers by dropping them to vertical bed 28 before they can form process disabling aggregates or clinkers in the preconditioning chambers. Those skilled in the art will thus appreciate that the height of the vertical bed in hopper 14 is large relative to the height of the beds formed in the preconditioners.

Thus, when the pellets of the batch 120 are sufficiently dry, the valve 178 is closed once again. The receptacle 102 is then moved laterally outwardly, at which time the pellets of the batch 120 above the lower edge of the wiper 118 (FIG. 5) are sidewise pushed over wall 112 off receptacles 102 and drop onto the upper surface of the pellet bed 28. This aids in breaking up or separating any pellets which might have adhered to one another when preconditioned on receptacle 102. The pellets preferably drop from about eighteen inches to about two feet onto the surface of the bed 28, and this enables small or minor aggregates to separate on impact. Obviously, the drop height should not be so great as to cause the pellets themselves to break up.

After reaching its outer position, the receptacle 102 again moves to the inner position and the receptacle is filled once again, the receptacles being discharged and filled sequentially. The valve 178 is again opened and preconditioning of the batch of pellets begins. By the use of a plurality of receptacles 102, a substantially continuous supply of preconditioned pellets to the bed 28 is achieved.

In the initial start-up phase, it is preferred not to use the furnace combustion products, but to instead provide a stream of separately provided combustion products to duct 54. These separately provided combustion products are employed until preheat chamber 14 is substantially full at which time the separate combustion product supply to duct 54 is discontinued and the furnace combustion gases employed. Desirably, for the start-up the separately provided combustion products will be the result of combustion of natural gas with an excess of stoichrometric air. Preferably, the start-up will be initiated with combustion products having a temperature of about 600° F. with the temperature being increased as the vertical bed height is increased. Before switching such combustion gases to the furnace flue gases, it is preferred that the temperature of the separately provided combustion products be about the same as the temperature of the flue gases to be used. Suitably, before switching to flue gases, the separately provided combustion products will have a temperature of about 1200° F. During start-up, the pellet bed height in hopper 14 will be allowed to accumulate to the height of distributor 62; as the bed height then further increases, a fraction of the pellets will be released from the hopper, so as to provide for periodic movement of the pellets in the bed, until the desired operating height is attained. A suitable valve 37 is used for this purpose. Conveniently, for example when employing pellets having a water content of about 12–14% (dry basis), the height of the wet preconditioning beds can be about 2 to 3 inches.

When it is desired to practice the present invention using an electrically powered glass melter, the agglomerates or pellets are dried and preheated by supplying hot, separately-provided combustion products to duct 54 and then supplying the preheated pellets to the electric melter for melting. Suitably, those combustion products will have a wet bulb temperature of about 100° F. to about 125° F., based on calculated water vapor, with representative dry bulb temperature being about 1200° F. or so. Alternatively, for either electrical melting or the start up with a combustion fired melter, the gaseous heating medium may be prepared by heating ambient air electrically.

Figure 8:
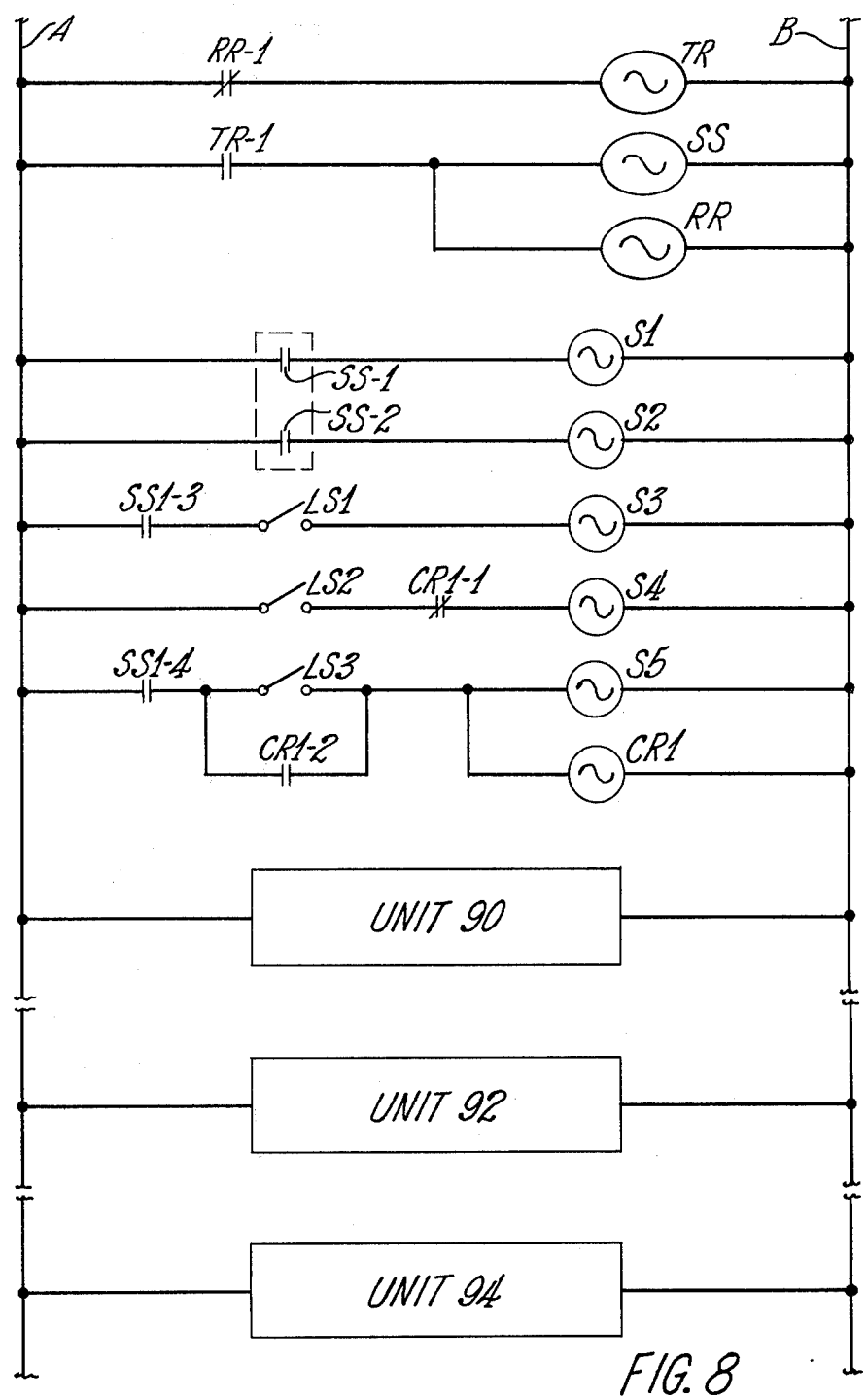
FIG. 8 is a diagrammatic view of controls for operating the preconditioner.

An illustrative circuit for sequentially operating preconditioning units 88, 90, 92 and 94 is shown diagramatically in FIG. 8. The limit switches, relays and actuating coils are shown for unit 88; units 90, 92, and 94 have similar configurations and thus are shown generally as block diagrams for the sake of clarity. A suitable power source (not shown) is connected to the control circuit by leads A and B. The series combination of adjustable timer TR, which determines the length of time that receptacles 102 are filled, and normally closed contacts RR-1, which are actuated by coil RR, is connected across leads A and B. The actuating coil SS of a four-step rotary stepper switch is connected in parallel with relay coil RR (reset relay), and this parallel combination is connected in series with normally open contacts TR-1, which are actuated by timer TR, across leads A and B. Each step of the stepper switch has four sets of contacts, for example, step 1 for preconditioning unit 88 consists of SS1-1, SS1-2, SS1-3 and SS1-4; a similar set of contacts is provided for each of units 90, 92 and 94.

One terminal of contacts SS1-1 is connected to lead A and the other side is connected to actuating coil S1, which moves supply valve 174 to a position in which pellets are directed into the left-hand branch duct 170, as viewed of FIG. 2. The series combination of SS1-2 and actuating coil S2, which moves left-hand supply valve 176 to a position in which pellets are directed into the back, left-hand branch duct 168 in FIG. 2, is connected across leads A and B. One terminal of contacts SS1-3 is connected to line A, and the other is connected to a normally open limit switch LS1. Limit switch LS1 is closed when left-hand supply valve 176 is in the position described above, i.e., the position in which the pellets are directed to the back, left hand branch duct 168 in FIG. 2. The other terminal of limit switch LS1 is connected to actuating coil S3 which, in turn, is connected to line B. Coil S3 closes valve 178 in exhaust duct 66 (FIG. 4) of unit 88; valve 178 is spring biased in the open position so that it opens when coil S3 is de-energized.

The series combination of normally open limit switch LS2, normally closed contacts, CR1-1 and actuating coil S4 is connected across lines A and B. Limit switch LS2 is closed when valve 178 is in its closed position. Coil S4 actuates appropriate valving to supply fluid under pressure to the rod end of cylinder 158 thus retracting receptacle 102. One terminal of contacts SS1-4 is connected to line A, and the other is connected to normally open limit switch L23, which is closed when receptacle 102 reaches the outer end of its travel. The other terminal of limit switch LS3 is connected to the parallel combination of actuating coil S5 and relay coil CR1 which, in turn, is connected to line B. Limit switch LS3 is shunted by normally open contacts CR1-2, which are actuated by coil CR1. Coil S5 actuates appropriate valving to supply pressurized fluid to the blind end of cylinder 158 to cause receptacle 102 to move to its inner position.

As discussed above, units 90, 92, and 94 are shown connected across lines A and B in block diagram form; however, each unit is provided with its own limit switches, relays and actuating coils. As is known in the art, some units may energize the same coils or may have a coil which is wound on the same core as a coil utilized by another unit. For example, coil S1 could be energized by either unit 88 or 90, since in either case valve 174, which is actuated by coil S1, must be in the position in which pellets are directed into the left-hand branch duct 170, as viewed in FIG. 2. Such an arrangement could be easily accomplished by connecting the appropriate contacts from the stepper switch position for unit 90, i.e., SS2-1, in parallel with SS1-1. Similarly, other suitable interconnections could be made if desired.

Referring to FIGS. 2, 4 and 8, the operation of the control circuit will be discussed for unit 88. Assuming that unit 94 has just completed its cycle, the stepper switch would be in position 1 for unit 88 in which contacts SS1-1, SS1-2, SS1-3, and SS1-4 are closed, and timer TR would be reset to run for its predetermined length of time. Timer TR, which determines the length of time that receptacles 102 are filled, is adjustable, for example, from 0 to 10 minutes. Contacts RR-1 are normally closed so that timer TR is connected across the power source and thus preceeds through its timing function. Contacts TR-1 are not closed until timer TR has timed out.

Contacts SS1-1 and SS1-2 simultaneously energize coils S-1 and S-2, respectively, which actuate valve 174 and left-hand supply valve 176 so that the pellets are directed to the back, left-hand branch duct 168, as viewed in FIG. 2. In this position, valve 176 closes limit switch LS1, thus energizing coil S3 which closes normally open valve 178 in exhaust duct 66. When valve 178 closes, it closes limit switch LS2 to energize coil S4, which opens a valve to provide pressurized fluid to the rod end of cylinder 158, thus causing receptacle 102 to open. When receptacle 102 reaches it outer end of travel, it closes limit switch LS3 which energizes coils S5 and CR1. CR1 opens contacts CR1-1 to de-energize coil S4 and thus close the valve that is supplying pressurized fluid to the rod end of cylinder 158. In addition, CR1 closes contacts CR1-2, thereby keeping coil S5 energized after receptacle 102 moves from its outer position. Coil S5 through appropriate valving provides pressurized fluid to the blind end of cylinder 158 which causes receptacle 102 to return to its inner position. During the time that receptacle 102 retracts and advances, some pellets will pass directly through unit 88, but this small quantity is not detrimental to the operation of the process.

Receptacle 102 is then filled until timer TR times out and closes contacts TR1. Closed contacts TR1 energize coil SS, which advances the stepper switch to the next position for unit 90, and energizes coil RR, which opens contacts RR-1 thereby de-energizing timer TR. When timer TR is de-energized it automatically resets to its predetermined time position and opens contacts TR1 which in turn, de-energize coil RR. Accordingly, timer TR is re-energized by contacts RR-1 and is ready to proceed with its timing function for unit 90.

With the above operation, the fill cycle for each of units 88-94 will be one-fourth of the overall cycle. Therefore, if timer TR is set for a predetermined time of two minutes, each unit will fill for two minutes and then dry for six minutes.

Figure 9A:
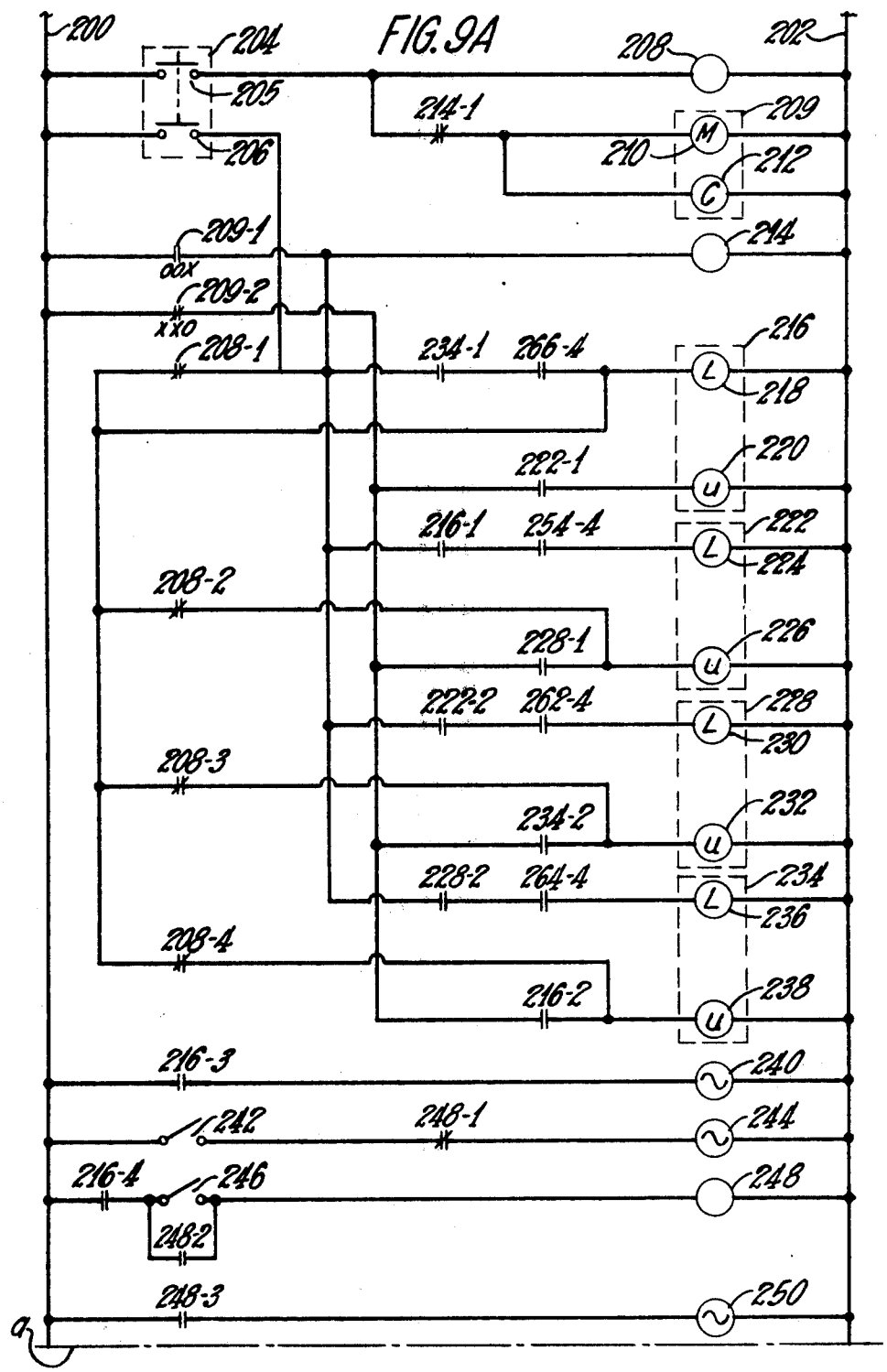
FIG. 9A is a diagrammatic view of an alternative control circuit for operating the preconditioner.
Figure 9B:
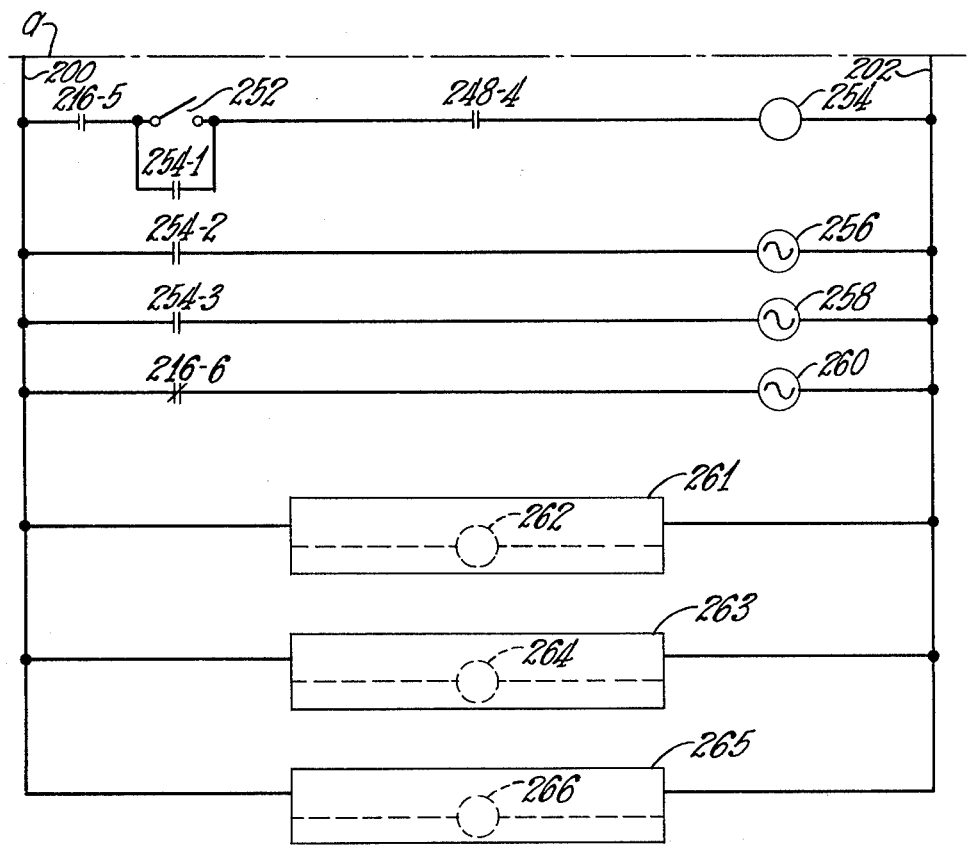
FIG. 9B is a continuation of the circuit of FIG. 9A.

An alternative circuit for sequentially operating preconditioning units 88-94 by utilizing latching relays instead of a stepper switch is shown diagramatically in FIGS. 9A and 9B, with FIG. 9B matching with FIG. 9A along matching line "a". For the sake of clarity, each set of contacts that is actuated by a coil is given the same numeral as the actuating coil plus an additional number, such as, relay coil 214 actuates contacts 214-1. If the coil actuates more than one set of contacts, the contacts are numbered sequentially.

Lines 200 and 202 are connected across a power source (not shown), which energizes the circuit when stop/start switch 204 is placed in the start position. Switch 204 actuates two sets of contacts, 205 and 206. Contacts 205 energize relay coil 208 and the series combination of normally closed contacts 214-1 and timer 209; such series combination shunting relay coil 208. Timer 209 consists of a motor 210 and a clutch 212 which are connected in parallel. Contacts 206 are connected to normally closed contacts 208-1. The other terminal of contacts 208-1 is connected to latching coil 218 of latching relay 216 and also to normally closed contacts 208-2, 208-3, 208-4, which are respectively connected to unlatching coil 226 of latching relay 222, unlatching coil 232 of latching relay 228 and unlatching coil 238 of latching relay 234. Contacts 208-1, 208-2, 208-3 and 208-4 are actuated by coil 208 such that the opening of the contacts is delayed for one second after coil 208 has been energized.

One terminal of normally open contacts 209-1 is connected to line 200, and the other is connected to relay coil 214 which, in turn, is connected to line 202. As shown in FIG. 9A, contacts 209-1 have the symbols "OOX" beneath them, with "O" symbolizing open and "X" symbolizing closed. Contacts 209-1 are actuated by timer 209 such that the first symbol indicates the position of contacts 209-1 during resetting of timer 209, the second symbol indicates the position during the timing function and the third symbol indicates the position of contacts 209-1 when timer 209 has timed out. Similarly, contacts 209-2 have the symbols "XXO", thus indicating that contacts 209-2 are closed during resetting, closed during timing, and open after timer 209 has timed out.

One terminal of contacts 209-2 is connected to line 200, and the other is connected to four parallel circuits, which are as follows: (1) normally open contacts 222-1 in series with unlatching coil 220 of latching relay 216; (2) normally open contacts 228-1 in series with unlatching coil 226 of latching relay 222; (3) normally open contacts 234-2 in series with unlatching coil 232 of latching relay 228; and (4) normally open contacts 216-2 in series with unlatching coil 238 of latching relay 234, the opposite terminal of each of the four said unlatching coils being connected to line 202. A line is connected between contacts 209-1 and relay coil 214 to energize the latching coils of the four latching relays through appropriate contacts with the four parallel circuits being as follows: (1) latching coil 218 in series with normally open contacts 234-1 and normally open contacts 226-4; (2) latching coil 224 in series with normally open contacts 216-1 and normally open contacts 254-4; (3) latching coil 230 in series with normally open contacts 222-2 and normally open contacts 262-4; and (4) latching coil 236 in series with normally open contacts 228-2 and normally open contacts 264-4, with the other terminal of each of the latching coils being connected to line 202.

The series combination of normally open contacts 216-3 and actuating coil 240, which closes valve 178 in exhaust duct 66 (FIG. 4) of unit 88, is connected across lines 200 and 202. The series combination of normally open limit switch 242, normally closed contacts 248-1 and actuating coil 244 are connected across lines 200 and 202. Limit switch 242 is closed by valve 178 when valve 178 is in its closed position; actuating coil 244 actuates appropriate valving to supply fluid under pressure to the rod end of cylinder 158, thus retracting receptacle 102. The series combination of normally open contacts 216-4, normally open limit switch 246 and relay coil 248 are connected across lines 200 and 202 with limit switch 246 being shunted by normally open contacts 248-2. Limit switch 246 is moved to its closed position by receptacle 102 when receptacle 102 has moved to its outermost position. Normally open contacts 248-3 and actuating coil 250, which actuates appropriate valving to supply fluid to the blind end of cylinder 158 to cause receptacle 102 to move to its inner position, are connected in series across lines 200 and 202.

One terminal of normally open contacts 216-5 is connected to line 200, and the other is connected to the parallel combination of normally open limit switch 252 and normally open contacts 254-1. The parallel combination is connected in series with normally open contacts 248-4 and relay coil 254 which, in turn, is connected to line 202. Limit switch 252 is moved to its closed position by receptacle 102 when receptacle 102 is in its inner position. Actuating coils 256, 258 and 260 are connected in series with normally open contacts 254-2, normally open contacts 254-3 and normally closed contacts 216-6, respectively, across lines 200 and 202. Actuating coil 256 moves supply valve 174 to a position in which pellets are directed into the left-hand branch duct 170, as viewed in FIG. 2. Actuating coil 258 moves the left-hand supply valve 176 to a position in which pellets are directed into the back, left-hand branch duct 168 in FIG. 2, and actuating coil 260 opens valve 178 in branch exhaust duct 66.

The electrical circuitry required for operating preconditioning units 90, 92 and 94, are shown generally by 261, 263, and 265. The specifics involved with each circuit have been eliminated for the sake of clarity, since such circuitry would be similar to that described for the operation of preconditioning unit 88. However, relay coils 262, 264, and 266 are shown within the appropriate blocks because such coils actuate their respective contacts which are located in the latching coil circuits.

Referring to FIGS. 2, 4, 9A and 9B, the operation of the control circuit for unit 88 is as follows. Operation is started by pushing stop/start switch 204 which closes contacts 205 and 206, thus energizing coil 208, latching coil 218, unlatching coil 226, unlatching coil 232, and unlatching coil 238. Such an arrangement insures that the sequence will always be started with preconditioning unit 88. After a time delay of one second, coil 208 opens contacts 208-1, 208-2, 208-3 and 208-4, thus de-energizing latching coil 218, unlatching coil 226, unlatching coil 232, and unlatching coil 238. Timer 209 is energized through normally closed contacts 214-1 thus allowing timer 209 to proceed through its predetermined time period. Contacts 214-1 will remain closed during the entire timing cycle since contacts 209-1 remain open during the timing cycle, thus disconnecting relay coil 214 from the power source.

In the latched position, latching relay 216 closes contacts 216-1, 216-2, 216-3, 216-4, 216-5 and opens contacts 216-6. Contacts 216-3 energize actuating coil 240 which closes valve 178 in exhaust duct 66 (FIG. 4) of unit 88. When valve 178 has closed, it closes limit switch 242 which energizes actuating coil 244 through normally closed contacts 248-1. Actuating coil 244 actuates appropriate valving to supply fluid under pressure to the rod end of cylinder 158, thus retracting receptacle 102. When receptacle 102 has reached its outermost position, it closes limit switch 246 thus energizing coil 248 through closed contacts 216-4. Coil 248 is maintained in its energized state by contacts 248-2 which shunt limit switch 246. By opening contacts 248-1, coil 248 disconnects actuating coil 244 from the power source, thus closing the pressurized fluid supply to the rod end of cylinder 158. Coil 248 also closes contacts 248-3 to energize actuating coil 250 which actuates appropriate valving to supply pressurized fluid to the blind end of cylinder 158 thereby causing receptacle 102 to move to its inner position.

When receptacle 102 has returned to its inner position, it closes limit switch 252, thus allowing relay coil 254 to be energized through closed contacts 216-5 and 248-4. Contacts 248-4 ensure that coil 254 cannot e energized unless receptacle 102 has gone through its cycle, i.e. moved outward and then inward. Coil 254 closes its contacts 254-1, 254-2, 254-3 and 254-4. Contacts 254-1, which shunt limit switch 252, maintain coil 254 in its energized state until latching relay 216 is unlatched. Contacts 254-2 energize actuating coil 256 which move supply valve 174 to a position in which pellets are directed into the left-hand branch duct 170, as viewed in FIG. 2, and contacts 254-3 energize actuating coil 258 which moves the left-hand supply valve 176 to a position in which pellets are directed into the back, left-hand branch duct 168 in FIG. 2. It should be noted that this circuit does not allow any pellets to pass through unit 88 during the time that receptacle 102 retracts and advances.

When timer 209 times out, it closes contacts 209-1 and opens 209-2. Contacts 209-1 energize latching coil 224 of latching relay 222, which operates preconditioning unit 90, through closed contacts 216-1 and 254-4. However, unlatching coil 220 for latching relay 216 is not energized by contacts 222-1, which are closed by latching relay 222, since contacts 209-2 are in the open position when timer 209 has timed out. However, contacts 209-1 also energize relay coil 214 which opens its contacts 214-1, thus disconnecting power from motor 210 and clutch 212, thereby resetting timer 209 to its predetermined time period. During reset, contacts 209-2 close to energize unlatching coil 220 thus opening contacts 216-1, 216-2, 216-3, 216-4, 216-5, and closing contacts 216-6. Closed contacts 216-6 energize actuating coil 260 which opens valve 178 in exhaust duct 66 of unit 88. After timer 209 has reset, it begins its timing function for unit 90, because coil 214 is de-energized by open contacts 209-1 thus allowing contacts 214-1 to return to their normally closed position.

From the foregoing, it can be seen that latching relay 222 in combination with similar circuitry shown diagramatically at 261 would operate preconditioning unit 90 in the same manner. Similarly, latching relay 228 in comination with circuit 263 and latching relay 234 in combination with circuit 265 would operate preconditioning units 92 and 94.

Thus, from the above it will be seen that by use of the present apparatus energy, which had been in the past wasted, can now be reclaimed. Additionally, the apparatus allows the use of cheaper energy sources for part of the needed heat when electric melting is contemplated. Also materials, especially in the flue gases of a combustion fired furnace, which normally decrease environmental quality are reclaimed and recycled into the melting operation. Since such gases pass through a vertical bed of substantial height, e.g., in excess of about 15 feet and more commonly in excess of about 20 feet, then through the wet preconditioning beds, which typically may have a height of about 2-9 inches, it will be appreciated that some materials are reclaimed and recycled by a filter-type action of the beds. Additionally, however, some materials are reclaimed by an in-situ reaction in either or both of the beds and some gaseous polluting species, because of the progressive temperature drop of the gases through the beds, are reclaimed by a condensation-type mechanism. If desired, a final material reclamation may be effected by employing a cyclone on the exhausted gas line. Consequently, when the elements of the present invention are combined, there is provided a synergistic, economical, energy-efficient, pollution-abating glass manufacturing apparatus.

Various modifications of the above-described embodiment of the invention will be apparent to those skilled in the art and it is to be understood that such modifications can be made without departing from the spirit and scope of the invention.

We claim:

1. In an apparatus for producing molten glass which includes means for forming glass batch into pellets, means for collecting the pellets in a bed, a glass melting furnace, means for supplying hot gases from the furnace through the bed of pellets to heat them, and means for supplying the heated pellets to the furnace, the improvement comprising means for collecting the pellets in at least two separate batches, said means for supplying the hot gases through the bed of pellets also includes means for supplying the hot gases through the batches of pellets after supplying the gases through the bed of pellets, and means for sequentially supplying the pellets of the batches to the bed of pellets and means for supplying the pellets of said separate batches to said bed, the height of said bed being large relative to the height of said separate batches.

2. Apparatus according to claim 1 characterized by said means for collecting the pellets in the batches being located above the bed of pellets, and said last-named means includes means for dropping the batches of pellets from the batch-collecting means onto the bed of pellets.

3. In an apparatus for producing molten glass which includes means forming glass batch into pellets, means for collecting the pellets in a bed, a glass melting furnace, means for supplying hot gases from the glass melting furnace through the bed of pellets to heat them, and means for supplying the heated pellets to the furnace, the improvement comprising a plurality of receptacles, means for supplying the pellets to the receptacles, said hot gas supply means also including means for supplying the hot gases through the receptacles, and means for sequentially supplying the pellets in the receptacles to the bed of pellets.

4. Apparatus according to claim 3 characterized by said means for supplying pellets to said receptacles supplies them to the receptacle in a sequential manner.

5. Apparatus according to claim 3 characterized by said means for supplying pellets from the receptacles to the bed of pellets comprises means for dropping the pellets from the receptacles onto the surface of the bed of pellets.

6. Apparatus according to claim 5 characterized by said dropping means drops the pellets from the receptacles in a sequential manner.

7. Apparatus for removing moisture from, and heating, free water containing glass batch agglomerates prior to melting them in a glass melting furnace, said apparatus comprising wall means forming a hopper chamber for holding a bed of agglomerates, means for supplying hot heating gases to a lower portion of said chamber, means for exhausting gases from an upper portion of said chamber, a porous, agglomerate-supporting receptacle positioned to be adjacently above said bed, said receptacle being located in the path of the exhausting gases, means for cyclically supplying said free water containing agglomerates to said receptacle, and means for discharging agglomerates from said receptacle onto the bed in the chamber therebelow.

8. Apparatus according to claim 7 characterized by said receptacle having a bottom comprising a plurality of parallel rods through which the gases can pass.

9. Apparatus according to claim 8 wherein said receptacle is so arranged and constructed that upon discharging said agglomerates therefrom a layer of agglomerates is retained thereon.

10. Apparatus for removing moisture from and heating glass batch agglomerates prior to supplying them to a glass melting furnace, said apparatus comprising wall means forming a hopper chamber for holding a bed of agglomerates, means for supplying hot gases to a lower portion of said chamber, at least two receptacles, exhaust means for drawing said hot gases through said chamber and said receptacles, said exhaust means including a main exhaust duct communicating with a branch exhaust duct located above each of said receptacles, means for supplying glass batch agglomerates to said receptacles including branch supply ducts located above said receptacles, and means for supplying glass batch agglomerates from said receptacles onto the bed in said chamber.

11. Apparatus according to claim 10 characterized by said former supply means including means for sequentially supplying the glass batch agglomerates to said receptacles.

12. Apparatus according to claim 10 characterized by said latter supply means supplying the agglomerates from said receptacles sequentially onto the bed in said chamber.

13. Apparatus according to claim 10 characterized by valves in said branch exhaust ducts, said valves being closed when said supply means is supplying glass batch agglomerates to the corresponding receptacle.

14. Apparatus according to claim 10 wherein said means for supplying hot gases to a lower portion of said chamber comprises duct means establishing gaseous fluid communication between said portion and said glass melting furnace.

15. Apparatus according to claim 10 characterized by said supply means including a main supply duct communicating with said branch supply ducts, said main supply ducts communicating with a generally cylindrical chamber, and rotary vanes in said cylindrical chamber to supply glass batch agglomerates downwardly therethrough but to prevent gas flow.

16. Apparatus for removing moisture from and heating pellets of glass batch material prior to supplying them to a glass melting furnace, said apparatus comprising wall means forming a hopper chamber for holding a bed of the pellets, means for supplying hot gas from the furnace to a lower portion of said chamber, means forming at least two pellet preconditioning chambers above said hopper chamber, a pellet-detaining receptacle for each of said preconditioning chambers, said receptacles having porous bottoms, a receptacle housing located adjacent each of said preconditioning chambers and communicating therewith through an opening, means for moving each of said receptacles between a position in said preconditioning chamber and a position in said receptacle housing, a wiper located at each of said openings and effective to push pellets off the associated receptacle when moving from said preconditioning chamber to said receptacle housing, exhaust means for drawing hot gases through said hopper chamber and through said preconditioning chambers, said exhaust means including a main exhaust duct communicating with a branch exhaust duct located above each of said preconditioning chambers, and means for supplying glass batch pellets to said receptacles, including branch supply duct located above each of said preconditioning chambers.

17. Apparatus according to claim 16 characterized by said supply means including means for sequentially supplying the pellets to said receptacles in said preconditioning chambers.

18. Apparatus according to claim 16 wherein said means moving each of said receptacles operates to discharge the pellets sequentially from said receptacles.

19. Apparatus according to claim 16 characterized by valves in said branch exhaust ducts, said valves being closed when said supply means supplies pellets to the associated receptacle.

20. Apparatus according to claim 16 characterized by said receptacle porous bottoms comprising a plurality of parallel, spaced bars.

21. Apparatus according to claim 16 characterized by said moving means comprising a fluid-operated cylinder having a piston rod connected to an outer end of the associated receptacle.

22. Apparatus according to claim 16 characterized by there being at least four of said pellet preconditioning chambers, four of said pellet-detaining receptacles, and four of said receptacle housings.

23. An energy-efficient, pollution abating apparatus for producing molten glass from free water containing agglomerates comprising:

a vertically elongate agglomerate preheating chamber; means for forming at least two separate beds of said agglomerates, said means being disposed upwardly of said chamber and being so arranged and constructed that said formed beds are disposed vertically upwardly of said chamber and inwardly of the maximum periphery of said chamber; means for discharging the agglomerates of said beds to said chamber; means supplying hot gases to said chamber for heating the agglomerates therein; means for passing said gases from said chamber through said formed beds; a glass melting furnace and means supplying heated agglomerates from said chamber to said furnace.

24. The apparatus of claim 23 wherein said discharging means includes means for exerting a laterally sidewise directed force on said beds.

25. The apparatus of claim 23 wherein said beds are sequentially formed.

26. The apparatus of claim 23 wherein said melting furnace is a combustion fired furnace and said means for supplying hot gases to said chamber comprises duct means in fluid communication with said furnace.

27. In a glass manufacturing apparatus comprising a shaft-type preheating chamber maintaining a vertical bed of gravitationally downwardly flowing glass batch agglomerates therein, means adapted to supply gaseous combustion products to said chamber upwardly through said bed to preheat the agglomerates, a glass melting furnace upstream of said preheating chamber, and means supplying preheated agglomerates from said chamber to said furnace, the improvement comprising plural preconditioning chambers disposed downstream of said shaft-type preheating chamber, means operatively associated with each of said plural chambers for forming separate static beds of glass batch agglomerates in said preconditioning chambers, means causing said gaseous combustion products to flow from said shaft-type preheating chamber through said preconditioning chambers and said static beds, and means operative to discharge said static beds from said preconditioning chambers and supply the agglomerates thereof to said shaft-type preheating chamber, and means supplying glass batch agglomerates to said preconditioning chambers.

28. The improvement of claim 27 wherein said means for forming said separate static beds includes a porous, movable, bed supporting means.

29. The improvement of claim 28 wherein said means operative to discharge said beds comprises a vertically adjustable wiper.

30. The improvement of claim 27 wherein said means for forming separate beds is cyclically operated.

31. The improvement of claim 27 wherein said means causing said combustion gases to flow through said preheating chambers includes valve means for directing said gases away from a first of said preconditioning chambers to another of said preconditioning chambers, and said means for supplying glass batch agglomerates to said preconditioning chambers includes agglomerate diverting means operating to supply agglomerates to said first chamber while said gases are directed therefrom and to the other of said chambers but not to supply agglomerates to said other chamber while said gases are directed thereto.

32. A glass manufacturing apparatus comprising:
a preconditioning chamber, means cyclically operating to supply a predetermined amount of glass batch agglomerates to said preconditioning chamber, gas permeable means movable in said preconditioning chamber for receiving and supporting said supply of agglomerates in the form of a bed, agglomerate preheating chamber means holding a substantial vertical bed of gravitationally downwardly moving agglomerates, means directing a gaseous heating medium into said preheating chamber and through said vertical bed to preheat said agglomerates, means causing said heating medium after passage through said vertical bed to flow to said preconditioning chamber, through said gas permeable means and said bed supported thereon, cyclically operating means for supplying the agglomerates of said bed supported on said gas permeable means after passage of said heating medium therethrough to said vertical bed, a glass melter, and means supplying preheated agglomerates from said preheating chamber to said melter.

33. The apparatus of claim 32 wherein said causing means includes a blower, duct means establishing fluid communication between said blower and said preconditioning chamber and valve means in said duct means, said valve means being closed while said cyclically operating agglomerate supply means supplies agglomerates to said chamber and open after said predetermined amount of pellets have been received and supported on said gas permeable means.

34. The apparatus of claim 32 including means in fluid communication with said preheating chamber means for supplying a gaseous medium to said gaseous heating medium after passage of said medium through said bed.

35. The apparatus of claim 34 wherein said gaseous medium is heated air.

36. An energy-efficient, pollution-abating apparatus for melting glass comprising:
vertically elongate chamber means maintaining a gravitationally downwardly flowing vertical bed of glass batch agglomerates, a glass melting furnace upstream of said elongate chamber, means adapted to supply a gaseous heating medium to said elongate chamber and to pass said medium directly through said bed so as to preheat said agglomerates to an elevated temperature, means for supplying preheated agglomerates from said elongate chamber to said furnace, at least two openings in said elongate chamber disposed upwardly of said flowin bed, a first preconditioning chamber substantially enveloping one of said openings and a second preconditioning chamber substantially enveloping the other of said openings, means for supplying glass batch agglomerates to said first and second chambers, separate means operatively associated with each of said first and second preconditioning chambers to receive said supply of agglomerates in the form of a shallow bed when in a first position in the preconditioning chamber and adapted to discharge agglomerates of the formed bed when in a second position into the opening associated with the preconditioning chamber, means for moving said separate means from said first position to said second position, said apparatus being so arranged and constructed that said gaseous heating medium after passage through said vertical bed has a flow path directing them through said shallow beds.

37. The apparatus of claim 36 wherein each of said separate means includes means for exerting a lateral sidewise force on said formed beds upon movement to said second position.

38. The apparatus of claim 36 wherein said means for supplying agglomerates sequentially operates to supply agglomerates to said first or second chamber and said separate means of each of said first and second chambers cyclically operate.

39. The improvement of claim 38 wherein said agglomerate supplying means is operated for a predetermined time interval so as to form shallow beds having a height of from about 2 to about 9 inches and wherein said vertical bed has a height of at least about 15 feet.

40. The apparatus of claim 36 including means in fluid communication with said elongate chamber means for introducing a gaseous medium to said elongate chamber upwardly of said vertical bed.

41. The apparatus of claim 27 and further including means for introducing heated air into said preheating chamber upwardly of said vertical bed.

42. Apparatus for removing moisture from, and heating, free water containing glass batch agglomerates prior to melting them in a glass melting furnace, said apparatus comprising wall means forming a hopper chamber for holding a bed of agglomerates, means for supplying hot heating gases to a lower portion of said chamber, means for exhausting gases from an upper portion of said chamber, a porous, agglomerate-supporting receptacle positioned to be adjacently above said bed, said receptacle being located in the path of the exhausting gases, means for cyclically supplying said free water containing agglomerates to said receptacle, and means for discharging agglomerates from said receptacle onto the bed in the chamber therebelow, said means for discharging agglomerates comprising means for applying a lateral force on said agglomerates, said apparatus further including means for moving said receptacle beneath said means for applying said lateral force.

43. A glass manufacturing apparatus comprising:
a preconditioning chamber, means cyclically operating to supply a predetermined amount of glass batch agglomerates to said preconditioning chamber, gas permeable means movable in said preconditioning chamber for receiving and supporting said supply of agglomerates in the form of a bed, agglomerate preheating chamber means holding a substantial vertical bed of gravitationally downwardly moving agglomerates, means directing a gaseoud heating medium into said preheating chamber and through said vertical bed to preheat said agglomerates, means causing said heating medium after passage through said vertical bed to flow of said preconditioning chamber, through said gas permeable means and said bed supported thereon, cyclically operating means for supplying the agglomerates of said bed supported on said gas permeable means after passage of said heating medium therethrough to said vertical bed, a glass melter, and means supplying preheated agglomerates from said preheating chamber to said melter, wherein said means for supplying agglomerates to said vertical bed comprises an opening in said preheating chamber, means for moving said gas permeable means and means engaging said formed bed for pushing said bed from said gas permeable means during movement thereof, said apparatus being so arranged and constructed that upon such pushing the agglomerates fall gravitationally downwardly through said opening.

44. Glass manufacturing apparatus comprising: duct means cyclically supplying glass batch agglomerates, movable means adapted to receive said cyclic supply of agglomerates in the form of a shallow bed when in a first position and to discharge agglomerates of said shallow bed when in a second position; chamber means maintaining a vertical bed of agglomerates with the height of said vertical bed being large relative to said shallow bed, opening means in said chamber adapted to receive discharged agglomerates, cyclically operating means for moving said movable means between said first and second positions; duct means directing hot gases to said chamber means, said latter duct means and chamber means being adapted to allow said hot gases to pass directly through said vertical bed, cyclically operating means for directing said gases after passage through said vertical bed through said shallow bed, a glass melter and means supplying agglomerates from said vertical bed, after heating by said hot gases, to said melter.

* * * * *

UNITED STATES PATENT AND TRADEMARK OFFICE
CERTIFICATE OF CORRECTION

PATENT NO. : 4,248,616
DATED : February 3, 1981
INVENTOR(S) : Stephen Seng, Richard K. Henry, Mark A. Propster and Charles M. Hohman It is certified that error appears in the above—identified patent and that said Letters Patent is hereby corrected as shown below:

At column 12, line 3, the word L23 should be changed to "LS3".

At column 12, line 38, the word preceeds should be changed to "proceeds".

At column 14, line 4, the word 226-4 should be changed to "266-4".

At column 15, line 35, the letter "e" at the end of the line should be changed to the word "be".

At column 20, line 40, the letters "win" at the beginning of the line should be changed to "wing".

At column 21, line 40, the first word in the line should be "gaseous".

Signed and Sealed this

Twenty-third Day of June 1981

[SEAL]

Attest:

RENE D. TEGTMEYER

Attesting Officer     Acting Commissioner of Patents and Trademarks